United States Patent Office 2,848,520
Patented Aug. 19, 1958

2,848,520

PREPARATION OF METHYLACETYLENE AND ETHYLACETYLENE

Thomas F. Rutledge, Madison, N. J., assignor to Air Reduction Company, Incorporated, New York, N. Y., a corporation of New York No Drawing. Application November 9, 1953
Serial No. 391,140

8 Claims. (Cl. 260—678)

This invention relates to the preparation of methylacetylene (propyne) and ethylacetylene (1-butyne) and has for its object the provision of an improved and highly efficient process for producing these compounds. In accordance with the invention, dialkyl sulfate is reacted with a dispersion of finely divided sodium acetylide, advantageously consisting mostly of particles less than 5 microns in diameter, in an organic liquid which is substantially inert with respect to sodium acetylide, under controlled temperature conditions to produce the desired alkyne.

In a preferred and especially advantageous embodiment of the invention, the sodium acetylide is prepared according to the process of the copending application of Alio J. Buselli and Thomas F. Rutledge, Serial No. 391,139, filed November 9, 1953, now patent No. 2,777,884 entitled, Process For Producing Sodium Acetylide and Improved Sodium Acetylide Product.

The conventional production methods of reacting sodium acetylide (prepared in liquid ammonia) with dimethyl or diethyl sulfate in liquid ammonia reaction medium having objectionable features which are well known and which are due largely to the difficulty in handling ammonia and to the formation of undesirable by-products. It has also been proposed heretofore to react acetylene with sodium disseminated in xylene to prepare sodium acetylide (German Patent 494,575). However, it has been found, as will appear hereinafter, that the yield of methylacetylene prepared from sodium acetylide made according to the aforementioned methods is limited theoretically to the amount indicated by the equation:

(1) 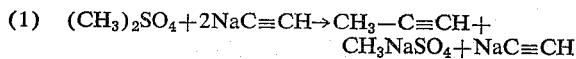

but in practice the yield has often been found to be substantially less than the theoretical upper limit. The yields obtained in reacting diethyl sulfate with sodium acetylide in accordance with prior methods have been correspondingly low.

The sodium acetylide prepared by the process of application can be 99% pure, containing less than around 1% of either or both sodium hydroxide and sodium carbonate, and is characterized principally by being a virtually white, free flowing powder, mainly less than 5 microns in diameter, which can be wetted by inert liquids without undesirable coalescence of the particles. Other characteristics include high thermal and storage stabilities. For example, the sodium acetylide may be exposed to the atmosphere without spontaneous ignition, and it may be stored for relatively long periods in dry air or inert gases such as argon or nitrogen.

In using the improved sodium acetylide in reaction with dimethyl sulfate in the same proportions according to this invention, quantitative yields of methylacetylene are obtained according to the reaction:

(2) 

It is believed that Equation 2 is the sum of Equations 3 and 4 below which may occur successively or practically simultaneously:

(3) 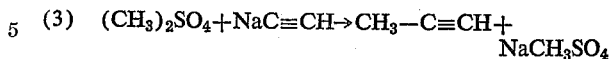

(4) 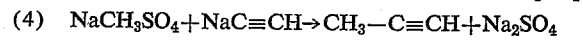

wherein dimethyl sulfate reacts with sodium acetylide to form methylacetylene and sodium methyl sulfate (Equation 2) and such sodium methyl sulfate reacts with unreacted sodium acetylide present in the reaction zone to form more methyl-acetylene and sodium sulfate (Equation 3).

Quite unexpectedly in view of the prior art, it was found that the invention involves both the alkyl groups of the esters of sulfuric acid. An outstanding feature of the invention is the quantitative yield of methylacetylene according to Equation 2, that is, two methyl groups per molecule of dimethyl sulfate react with sodium acetylide according to the method of this invention, whereas the prior art reports only from 0.4 to 1.0 methyl groups per molecule as the maximum reactivity. Although quantitative yields of ethylacetylene have not been attained, the somewhat lower degree of conversion is not surprising in view of the relative reactivities of dimethyl sulfate and diethyl sulfate with other materials. The degree of reactivity of diethyl sulfate with the improved sodium acetylide has been found to be about twice as great as the average of the values of the prior art. By the process of this invention, about 1.4 ethyl groups per molecule of diethyl sulfate have been found to react, whereas a range of 0.3 to 1.0 groups per molecule have been reported previously as the maximum reactivity of diethyl sulfate with sodium acetylide.

Briefly, sodium acetylide is prepared according to the process of said application by adding a dispersion of sodium in a liquid such as xylene to di-n-butyl ether in a reactor equipped with a thermometer, heater, stirrer and acetylene inlet. Dry, purified acetylene is bubbled into the dispersion at a temperature of from 60° C. to 80° C. After the evolution of hydrogen has stopped, the reaction resulting in the production of sodium acetylide has been completed. The sodium acetylide in a fine state of sub-division (around 5 microns or less in diameter) is in suspension in the di-n-butyl ether. The sodium acetylide prepared by the process of the copending application can be reacted with a dialkyl sulfate while still suspended in the original liquid reaction medium in which it was formed or it can be first separated from the reaction medium by some conventional means (such as filtration or centrifugation) and substantially dried, for example, by vacuum drying. The filtered and dried sodium acetylide can be stored or transported, if desired. It can then be re-suspended in the same reaction medium (zylene, for example) or it can be dispersed in a different medium such as di-n-hexyl ether for the subsequent reaction with an alkyl sulfate. If dimethyl sulfate is to be added directly to the sodium acetylide as formed in the first reaction medium, it is advantageous to remove excess unreacted acetylene before adding the alkyl sulfate. With liquids such as xylene or di-n-butyl ether, the mixture can be refluxed for 15 or 20 minutes to effect removal of the acetylene. With higher boiling liquids such as di-n-butyl Carbitol, the suspension can be heated to about 150° C. while at a reduced pressure about 10 minutes. Both these methods appear to remove virtually all the dissolved acetylene which had not been converted to the acetylide.

The liquid medium must be relatively inert with respect to sodium acetylide and the dialkyl sulfates. Representative liquid media include aromatic hydrocarbons (xylene), dialkyl ethers (di-n-hexyl ether), alkyl ethers of glycols or polygylcols (di-n-butyl Carbitol), and aliphatic hydrocarbons (kerosene). Generally the desired liquid media have boiling points above the reaction temperatures used in the process of this invention or in the process of the copending application. The reaction environment must be substantially free from moisture to prevent decomposition of the reactants.

the mixture was then increased to about 140° C. for about 3½ hours. Liquid methylacetylene was collected in a Dry Ice trap which was subsequently warmed so as to gasify the product. Substantially 100% yield of methylacetylene based on both reactants was obtained.

Other examples to illustrate the production of methylacetylene from sodium acetylide prepared according to the method of the copending application follow:

*Table 1*

| Run | Moles Sodium Acetylide | Moles Dimethyl Sulfate | Reaction Medium | Volume of Medium (ml.) | Reaction Time, Hrs. | Reaction Temp., °C. | Yield, Mole Percent Based on— NaHC$_2$ | Yield, Mole Percent Based on— (CH$_3$)$_2$SO$_4$ a |
|---|---|---|---|---|---|---|---|---|
| 1 | ¼ | ⅛ | Dibutylether | 300 | 3½ | 70-142 | 100 | 100 |
| 2 b | ¼ | ⅛ | Xylene | 300 | 2 | 95-138 | 95 | 95 |
| 3 | ¼ | ⅛ | Dibutylether | 300 | 2½ | 80-142 | c 75 | 100 |
| 4 | ⅓ | ⅛ | Xylene | 300 | 2½ | 80-140 | c 70 | 95 |
| 5 | 1 | ½ | ___do___ | 300 | 3½ | 60-137 | 90 | 90 | a Calculated on the basis that both alkyl groups react according to Equation 2. The yields are reproducible within the limits of accuracy of the analytical method (potassium iodomercurate titration), that is ±2 percent.
b After the sodium acetylide was formed, it was separated from the xylene by filtration, washed with hexane, and dried. It was later suspended in fresh xylene for this reaction.
c It will be noted that there is a 33% excess of sodium acetylide in runs 3 and 4. When allowance is made for this excess, the yields in runs 3 and 4 are 100 and 92%, respectively, when based on an amount of sodium acetylide equivalent to the dimethyl sulfate as expressed by Equation 2.

In carrying out a process of the invention, dimethyl sulfate is added to the suspension of sodium acetylide in an inert reaction medium at a temperature of 60° C. to 80° C. at such a rate as to maintain an easily controlled reaction. When the mixture is heated, a pronounced evolution of heat is observed at about 100° C.; this thermal phenomenon is considered to indicate a reaction of dimethyl sulfate with sodium acetylide. It is advantageous to heat the mixture to between 140° C. and 160° C. to bring about completion of the reaction and to cause an evolution of methylacetylene which may be retained in a state of solution in the reaction medium. The higher temperature is maintained for 2½ hours to 3½ hours. After this period, methylacetylene is no longer evolved.

Purification of the methylacetylene has been advantageously accomplished by distillation through a simple packed column equipped with a cold finger refrigerated with alcohol and Dry Ice. A distillation head set for total reflux can be fitted to the top of a flask containing the liquid product. When the head is maintained at a temperature below the dew point of methylacetylene, the evaporated methylacetylene is recondensed by the cold finger while the vaporized acetylene is not condensed and is allowed to escape through suitable protective drying agents to a vent system.

The following typical examples will serve only to illustrate the invention more fully, and accordingly they are not to be constructed as limiting the scope of the invention:

EXAMPLE 1

A dispersion of sodium (average particle size 10 to 25 microns) in xylene, corresponding to 0.25 mole of sodium metal, was added to 300 ml. of di-n-butyl ether in a glass reactor which was equipped with a stirrer condenser, thermometer, acetylene inlet tube and an electric heating mantle. Dried purified acetylene gas was bubbled into the dispersion maintained at from 60° to 80° C. After about 2 hours no further evolution of hydrogen was recorded by a hydrogen analyzer in the gas stream. Excess acetylene was removed by refluxing the reaction medium (B. P. 140° C.). As a result of this step, the methylacetylene product contained only about 1 percent acetylene.

The resulting suspension of sodium acetylide (less than 5 micron in diameter) in di-n-butyl ether was cooled to about 70° C. and 0.11 mole of dimethyl sulfate was added over a period of 30 minutes. A pronounced exothermic effect was noted at about 100° C. The temperature of Another outstanding advantage of the process of the invention is the obtaining of essentially quantitative yields of methylacetylene based on the conversions of both the sodium acetylide and the dimethyl sulfate according to Equation 2.

Economically it is advantageous to use a 1:2 molar ratio of dimethyl sulfate and sodium acetylide, but other ratios may be utilized.

The reaction of diethyl sulfate with sodium acetylide can be illustrated by the following examples.

EXAMPLE 2

To a dispersion of 0.25 mole of sodium acetylide in 300 ml. of xylene at about 100° C. was added 0.33 mole of diethyl sulfate over a period of about 15 minutes. The temperature was gradually increased to 140° C., and after a reaction time of 4½ hours, heating was discontinued. The product of this reaction was analyzed to be 8.8 grams of 1-butyne which corresponds to a yield of 65 mole percent based on the reaction of the two ethyl groups of diethyl sulfate.

(5) $(C_2H_5)_2SO_4 + 2NaC{\equiv}CH \rightarrow 2C_2H_5-C{\equiv}CH + Na_2SO_4$ It is believed that Equation 5 is the sum of Equations 6 and 7 below which may occur successively or practically simultaneously:

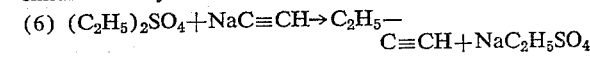

(6) $(C_2H_5)_2SO_4 + NaC{\equiv}CH \rightarrow C_2H_5-C{\equiv}CH + NaC_2H_5SO_4$

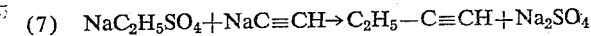

(7) $NaC_2H_5SO_4 + NaC{\equiv}CH \rightarrow C_2H_5-C{\equiv}CH + Na_2SO_4$

EXAMPLE 3

0.25 mole (14.5 g.) of finely dispersed sodium metal (10 to 25 micron particle size) in an equal weight of xylene was added to 300 cc. of di-n-hexyl ether which had been distilled and stored over sodium. The sodium dispersion had been stabilized with 0.25% aluminum stearate. Agitation was started and the mixture was heated to about 100° C. Acetylene was then introduced for 1 hour 50 minutes without stopping the agitation. After the acetylene flow had been discontinued, excess unreacted acetylene was removed by maintaining the reaction mixture at a pressure of about 20 mm. Hg absolute while at 145° C. The mixture was cooled to about 100° C. before 0.33 mole of diethyl sulfate was added during a period of 40 minutes. The temperature was increased to 170° C. and held at that temperature for 1 hour after which the temperature was further increased to 207° C. and held at that point for an additional 30 minutes. The product of this reaction was analyzed to be 9.4 grams of 1-butyne, which is a yield of 70 mole percent based on two ethyl groups per molecule of diethyl sulfate. (The temperature increment above 170° C. was not particularly effective in increasing the amount of ethylacetylene collected.)

It is evident that the present invention makes possible the production of alkynes in satisfactory yields and at relatively low cost. The equipment for carrying out the process is very simple; the conditions required in the process are not extreme; the use of an inert liquid reaction medium having a relatively high boiling point is largely free of the disadvantages associated with the use of conventional reaction media (such as liquid ammonia); and the process is rapid and efficient. The inert high-boiling liquid reaction medium of this process is easily recovered and reused. Because the process is conducted near atmospheric pressure, the compressors and refrigerating units required by some conventional processes for the preparation of alkynes are not required.

Further, it is not necessary to produce the alkynes immediately after the preparation of the sodium acetylide nor even in the same reactor. Previously prepared, relatively stable sodium acetylide which has been filtered, dried, and stored can be utilized at some future time for the preparation of the alkynes.

While the specific embodiments of the invention have been described in connection with a batch type operation, it will be understood that equally good results may be obtained when the invention is carried out in a continuous operation. It will also be understood that the invention is not limited to the specific examples described herein, but may be practiced in other ways without departing from the spirit and scope of the invention as defined by the following claims.

While the preceding examples have disclosed that methylacetylene and ethylacetylene are produced by reaction of sodium acetylide with dimethyl sulfate and diethyl sulfate, respectively, by the method of this invention, it will be understood that the sodium acetylide may be reacted with a dialkyl sulfate ester or a sodium monoalkyl sulfate broadly to produce an alkyl acetylene.

We claim:

1. The process of producing an alkyne of the group consisting of methylacetylene and ethylacetylene which comprises forming a dispersion of monosodium acetylide in an organic liquid, said acetylide being of high purity, virtually white, and in a finely divided state, said liquid being substantially inert with respect to the reactants and products of reaction, introducing into the dispersion a compound of the group consisting of dimethyl sulfate and diethyl sulfate, and conducting the reaction under controlled temperature conditions to produce the desired alkyne in accordance with the following equation $$Et_2SO_4 + 2NaC \equiv CH \rightarrow 2Et-C \equiv CH + Na_2SO_4$$

in which Et represents the alkyl group of said sulfates.

2. The process of claim 1 in which dimethyl sulfate is reacted with sodium acetylide at a temperature of from 60° C. to 160° C. and at atmospheric pressure according to the equation

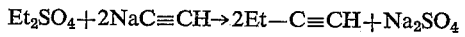

in which both methyl groups of the dimethyl sulfate react with sodium acetylide to form methylacetylene, and the yield of methylacetylene is substantially quantitative on the basis of dimethyl sulfate conversion.

3. The process of claim 1 in which diethyl sulfate is reacted with sodium acetylide at a temperature of from 100° C. to 170° C. and at atmospheric pressure according to the equation $$(C_2H_5)_2SO_4 + 2NaC \equiv CH \rightarrow 2C_2H_5-C \equiv CH + Na_2SO_4$$

in which both ethyl groups of the diethyl sulfate react with sodium acetylide to form ethylacetylene.

4. The process of claim 1 in which the sodium acetylide particles are mostly below 5 microns in diameter.

5. The process of claim 1 in which the inert material is a material selected from the group consisting of aromatic hydrocarbons, dialkyl ethers, alkyl ethers of glycols, alkyl ethers of polyglycols, and aliphatic hydrocarbons.

6. The process of producing an alkyne of the group consisting of methylacetylene and ethylacetylene which comprises reacting acetylene in a high state of purity with finely divided sodium particles dispersed in an organic liquid medium inert with respect to said reactants and products of reaction, at a temperature of from about 60° C. to about 110° C. to obtain monosodium acetylide in the liquid, the yield of monosodium acetylide being substantially quantitative on the basis of sodium conversion, introducing into said liquid a compound of the group consisting of dimethyl sulfate and diethyl sulfate, and conducting this latter reaction under controlled temperature conditions according to the equation

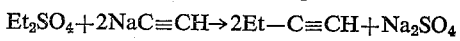

in which Et represents the alkyl group of said sulfates.

7. The method of claim 6 in which dimethyl sulfate is reacted with monosodium acetylide particles preponderantly less than 5 microns in diameter, and conducting said reaction at a temperature of from about 60° C. to 160° C. and atmospheric pressure to form methylacetylene in a substantially quantitative yield on the basis of dimethyl sulfate conversion.

8. The method of claim 6 in which diethyl sulfate is reacted with monosodium particles preponderantly less than 5 microns in diameter, and conducting said reaction at a temperature of from about 100° C. to 170° C. and at atmospheric pressure to form ethylacetylene, said reaction characterized in having more than 1.0 ethyl group per molecule of diethyl sulfate react with said monosodium acetylide.

References Cited in the file of this patent

UNITED STATES PATENTS

| 1,963,934 | Carothers et al. | June 19, 1934 |
| 2,198,236 | Vaughn | Apr. 23, 1940 |
| 2,605,295 | Garner et al. | July 29, 1952 |

FOREIGN PATENTS

| 494,575 | Germany | Mar. 28, 1930 |

OTHER REFERENCES

Hurd and Meinert, Jour. Am. Chem. Soc., vol. 53 (1931), pp. 289–300 (abstracted in Chem. Abstracts, vol. 25 (1931), p. 911).